United States Patent
Kent

[15] 3,637,217
[45] Jan. 25, 1972

[54] PUZZLE WITH PIECES IN THE FORM OF SUBDIVIDED RHOMBUSES

[72] Inventor: Sherman Kent, 2824 Chain Bridge Road N.W., Washington, D.C. 20016

[22] Filed: Feb. 13, 1970

[21] Appl. No.: 11,143

[52] U.S. Cl. .................................................273/157 R
[51] Int. Cl. ...................................................A63f 9/06
[58] Field of Search.....................273/156, 157 R; 35/27, 34, 35/72; 46/16, 17, 23

[56] References Cited

UNITED STATES PATENTS

| | | | |
|---|---|---|---|
| 143,835 | 10/1873 | Muller | 273/27 X |
| 907,203 | 12/1908 | Walker | 273/157 R |
| 1,236,234 | 8/1917 | Troje | 273/157 R UX |
| 3,178,332 | 4/1965 | De La Rive Box | 273/157 R X |

FOREIGN PATENTS OR APPLICATIONS

| | | | |
|---|---|---|---|
| 1,039,473 | 5/1953 | France | 273/157 R |
| 10,776 | 1891 | Great Britain | 273/157 R |

OTHER PUBLICATIONS

Creative Playthings Catalog, received in Art Unit 334 1/28/69 page 42. relied on Primary Examiner—Anton O. Oechsle
Attorney—Morton, Bernard, Brown, Roberts & Sutherland

[57] ABSTRACT

An educational puzzle made up of a plurality of blocks or puzzle pieces having the shapes of a rhombus and forms generated by dividing the rhombus. Puzzles can be formed having, for example, a hexagonal shape utilizing various combinations of the pieces. A hexagonal container can hold a plurality of puzzles of varying complexity which can then be assembled within the container so that unless each puzzle is properly assembled, the last puzzle cannot be assembled.

20 Claims, 4 Drawing Figures

PATENTED JAN 25 1972

3,637,217

INVENTOR
SHERMAN KENT

BY McLean, Morton & Boustead
ATTORNEYS

PUZZLE WITH PIECES IN THE FORM OF SUBDIVIDED RHOMBUSES

The present invention pertains to an educational toy. More particularly, the present invention pertains to a puzzle made up of a plurality of pieces having geometric shapes which when connected form a geometric pattern.

It is known that children are capable of learning many concepts at an early age. Mathematical relationships and geometric patterns can be taught to very young children, for example children of an age above about three years. Such teaching is greatly aided by the use of a teaching device of a type which maintains the child's interest while illustrating the concepts. Thus, if the teaching device takes the form of a game or toy, it retains the child's interest for a long period of time, while serving to teach the child numerous things. Geometric relationships can be taught to a young child even though the child is so young that he is incapable of expressing the relationships verbally. The present invention is a puzzle type of game by means of which geometric relationships can be taught. Even aside from the teaching of geometric relationships, the puzzle provides mental activity for the user which stimulates mental growth.

In accordance with the present invention, a puzzle is comprised of a plurality of pieces of a basic regular geometric shape such as a rhombus and of regular geometric shapes formed by subdividing the basic rhombus shape. Preferably, a container is provided having a shape corresponding to the regular geometric pattern of the finished puzzle and capable of holding a plurality of the finished puzzles which, for example, might include puzzles made up of various ones of the several shapes formed by subdividing the basic rhombus so that the several puzzles constitute a set of puzzles of varying difficulty.

These and other aspects and advantages of the present invention are more apparent in the following description and claims, particularly when considered in conjunction with the accompanying drawings in which:

Figure 1:
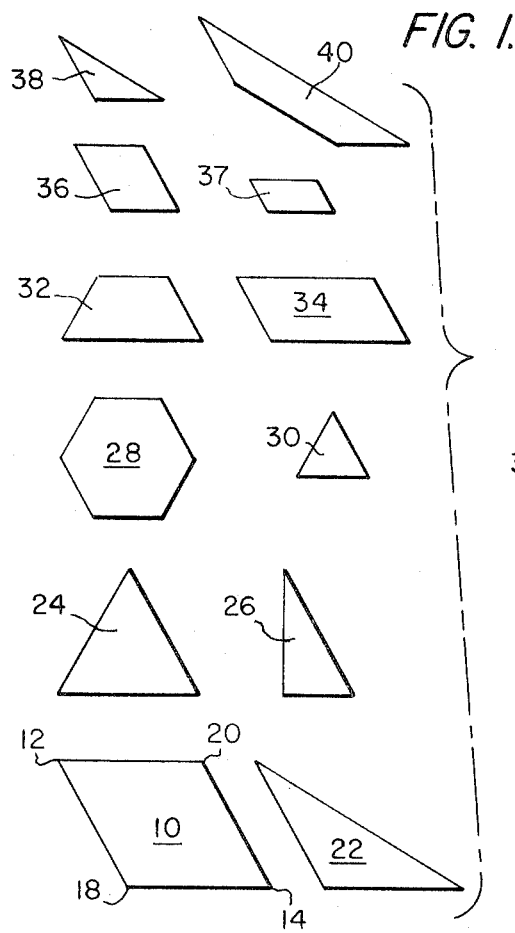
FIG. 1 depicts the basic rhombus shape and several of the regular geometric shapes formed by subdividing that basic rhombus shape.

Block 10 in FIG. 1 depicts the basic rhombus shape utilized to form the puzzle of the present invention. Preferably, block 10 has corners 12 and 14 of 60° and corners 18 and 20 of 120°. Other regular geometric shapes are formed by subdividing the basic rhombus shape depicted by block 10. Thus, for example, block 22 is formed by subdividing block 10 on a line connecting corners 12 and 14, and block 22 forms an isosceles triangle. The corners of block 22 are 30°, 30° and 120°. Similarly, block 24 is formed by cutting block 10 on a line connecting corners 18 and 20, and thus block 24 comprises an equilateral triangle. Block 26 is formed by bisecting block 24 and thus constitutes a 30°—60° right triangle. Block 28 is a regular hexagon formed by cutting block 10 on a line connecting the midpoints of side 12–18 and side 12–20 and on a line connecting the midpoints of side 14–18 and side 14–20. Block 30 then depicts one of the portions removed from one side of block 10 to form block 28 and constitutes a small equilateral triangle with an area one-eighth that of block 10. Block 28 therefore has an area three-fourths that of block 10. Block 32 is formed by bisecting block 28 and constitutes a trapezoid with an area three-eighths that of block 10. Thus, if blocks 30 and 32 are placed together they form an equilateral triangle the same size as block 24.

Block 34 is formed by bisecting block 10 on a line parallel to one of its sides, and constitutes a rhomboid. Blocks 22, 24 and, 34 thus each have an area equal to one-half the area of the rhombus of block 10, while block 26 has an area one-fourth the area of block 10. Block 36 is formed by bisecting block 34 and constitutes a rhombus having an area equal to one-fourth the area of block 10. Block 37 is formed by bisecting block 36 on a line parallel to one of its sides, and constitutes a rhomboid one-fourth the size of block 34 and thus one-eighth the size of block 10. Block 38 is a small isosceles triangle formed by cutting block 36 in the same manner as block 22 is formed from block 10. Block 38 therefore has an area one-eighth the area of block 10. Likewise, block 38 can be formed by cutting block 22 on a line connecting the midpoints of its equal sides. This cutting would divide block 22 into block 38 and block 40, and so block 40 has an area three-eighths the area of block 10. The blocks formed by subdividing block 10, as illustrated in FIG. 1, each have an area that is an integral multiple of one-eighth the area of block 10. These several blocks in FIG. 1 are illustrative of the many shapes which can be formed by dividing the basic rhombus shape of block 10. Blocks 10 and 36, blocks 22 and 38, blocks 24 and 30, and blocks 34 and 37 are all of similar shapes but different sizes. Numerous other blocks of smaller sizes and having shapes similar to shapes shown in FIG. 1 can likewise be formed, as well as blocks of other shapes and sizes. Every block formed for the puzzle of the present invention preferably has corners forming angles which are integral multiples of 30°. By way of example, the blocks might be made of wood or of a sturdy paperboard and might have a thickness in the order of three-fourths inch.

Figure 2:
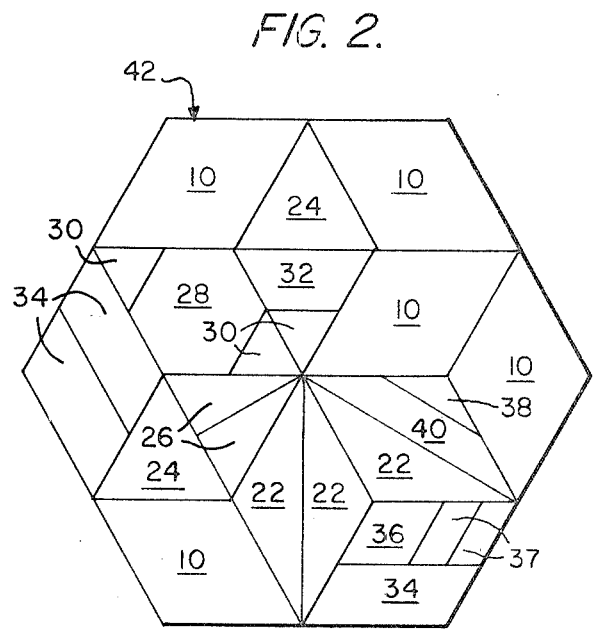
FIGS. 2 and 3 are plan views illustrating puzzles utilizing combinations of the regular geometric shapes of FIG. 1.
Figure 3:
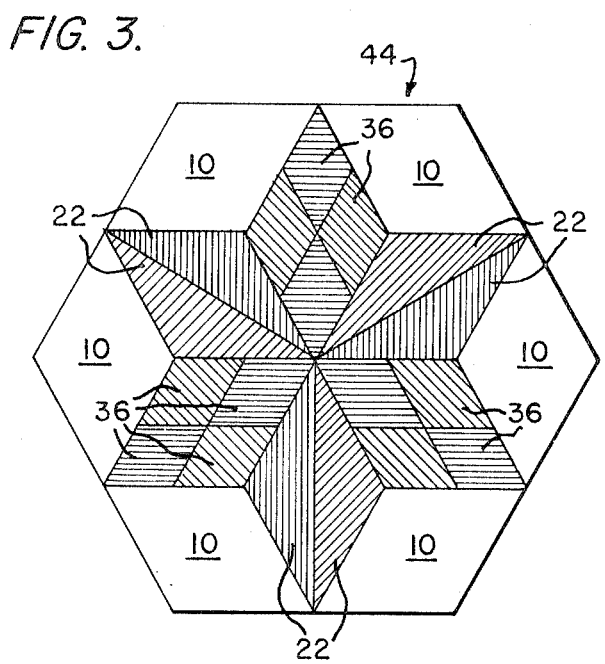

FIG. 2 depicts a regular hexagonal geometric pattern puzzle shape 42 which can be formed by placing in juxtaposition pieces of the shapes depicted in FIG. 1. In its simplest form a regular hexagonal puzzle shape of the size of puzzle 42 could be made up of 12 rhombuses of the type depicted by block 10. Six of these rhombuses are placed with their 60° corners touching to form a hexagram, and the remaining six fill in the areas between adjacent points of that hexagram to give a hexagon. In FIG. 2, puzzle 42 illustrates the use of each of the blocks of FIG. 1 which are designated in FIG. 2 by reference numerals corresponding to those of FIG. 1. FIG. 3 likewise depicts a puzzle 44 having a regular hexagonal pattern and formed by juxtapositioning selected ones of the puzzle pieces of FIG. 1. The resulting pattern and the puzzle's appeal to users are enhanced by coloring various ones of the blocks with different bright colors.

Figure 4:
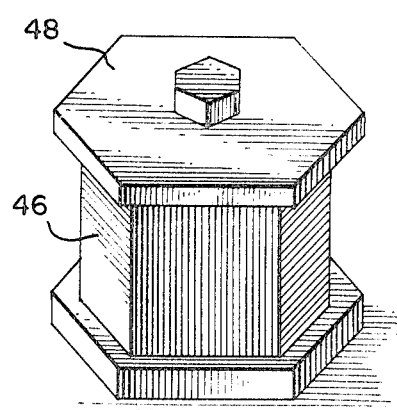
FIG. 4 is a perspective view of a container for holding a plurality of puzzles in accordance with the present invention.

FIG. 4 depicts a container 46 having a regular hexagonal cross section and suitable for holding several puzzles of the type depicted in FIGS. 2 and 3. Container 46 is likewise made of a sturdy material such as wood or cardboard with a thickness in the order of one-fourth inch and includes a removable top 48. Container 46 can be provided with a set of puzzles of varying difficulty. Thus, for example, container 46 might be provided with six puzzles, the first of these puzzles might include only rhombuses of the type depicted by block 10 and thus would be completed with 12 such puzzle pieces. The remaining puzzles might include a first group of puzzle pieces of the rhombus shape depicted by block 10 and a second group of puzzle pieces of the regular geometric shapes formed by subdividing rhombus 10, as depicted in FIG. 1. In one of these remaining puzzles this second group of puzzle pieces might be composed of the larger triangles, depicted by blocks 22 and 24, and the rhomboid of block 34. Another puzzle might add to this second group of puzzle pieces the smaller rhombuses 36 and, for example, could be a puzzle 44 as depicted in FIG. 3. The remaining puzzles can include as a portion of this second group of puzzle pieces additional ones of the blocks of FIG. 1 or other blocks and thus can be of increasing complexity. By increasing the number of different shape and size blocks in each puzzle, the difficulty of the puzzle and the challenge to the user are increased. Thus, the first puzzle would provide entertainment and educational benefit for a very young child, while the later puzzles do the same for older users, as well as providing a relaxing pastime activity. If the set of puzzles provided in container 46 includes only enough puzzle pieces to complete the full set, then a person putting together the puzzles within container 46 would be required to properly complete each puzzle in order to be able to finish all six puzzles within the container. The degree of difficulty can be varied by making each piece the same color or by having pieces of different colors to provide a code by means of which a solution to the puzzles can be indicated. It will be observed that each puzzle is readily completed if, before placing pieces into container 46 as a part of the puzzle, the pieces are first laid out in the shape of a rhombus, for example, as formed by blocks 22, 38, and 40 in puzzle 42 of FIG. 2.

It can thus be seen that the puzzle of the present invention provides educational activity for the very young and a relaxing pastime for older persons, utilizing as a basic shape the rhombus as depicted by block 10 and further utilizing shapes formed by subdividing that rhombus shape into shapes such as those depicted in FIG. 1. Numerous other shapes can, of course, be generated by subdividing the several blocks of FIG. 1. Other alterations and rearrangements might likewise be made and yet the results would be within the scope of the invention.

What is claimed is:

1. A puzzle comprising a plurality of puzzle pieces capable when placed in juxtaposition of forming a puzzle shape of a regular hexagon, each of a first group of said plurality of puzzle pieces being a rhombus and being of the same area and each of a second group of said puzzle pieces being a regular geometric shape formed by subdividing a rhombus, and being of one-half the area of a piece in said first group of puzzle pieces, said second group of puzzle pieces including equilateral triangles, isosceles triangles, and rhomboids.

2. A puzzle comprising a plurality of puzzle pieces capable when placed in juxtaposition of forming a puzzle shape of a regular hexagon, each of a first group of said plurality of puzzle pieces being a rhombus and each of a second group of said puzzle pieces being a regular geometric shape formed by subdividing a rhombus, said second group of puzzle pieces including equilateral triangles, isosceles triangles, and rhomboids with said equilateral triangles being of at least two different sizes.

3. A puzzle as claimed in claim 2 in which a portion of said second group of puzzle pieces are right triangles.

4. A puzzle as claimed in claim 3 in which a portion of said second group of puzzle pieces are regular hexagons.

5. A puzzle as claimed in claim 4 in which a portion of said second group of puzzle pieces are trapezoids.

6. A puzzle as claimed in claim 5 in which the corners of each puzzle piece define angles which are integral multiples of 30°.

7. A puzzle set comprising:
a box having a cross section of a regular hexagon;
a plurality of puzzles, each puzzle including a plurality of puzzle pieces capable when placed in juxtaposition of forming a puzzle shape of the regular hexagon of said box, each of a first group of said plurality of puzzle pieces of at least some of said plurality of puzzles being a rhombus and being of the same area and each of a second group of said plurality of puzzle pieces of at least some of said puzzles being formed by subdividing a rhombus and having an area equal to one-half the area of pieces of said first group of puzzle pieces, said second group of puzzle pieces including equilateral triangles, isosceles triangles, and rhomboids.

8. A puzzle set comprising:
a box having a cross section of a regular hexagon;
a plurality of puzzles, each puzzle including a plurality of puzzle pieces capable when placed in juxtaposition of forming a puzzle shape of the regular hexagon of said box, each of a first group of said plurality of puzzle pieces of at least some of said plurality of puzzles being a rhombus, and a second group of said plurality of puzzle pieces of at least some of said puzzles including equilateral triangles, isosceles triangles, rhomboids, right triangles, regular hexagons and trapezoids formed by subdividing a rhombus.

9. A puzzle comprising a plurality of puzzle pieces capable when placed in juxtaposition of forming a puzzle shape of a regular geometric pattern, each of a first group of said plurality of puzzle pieces being a rhombus and being of the same area and each of a second group of said puzzle pieces being a regular geometric shape formed by subdividing a rhombus and having an area equal to an integral multiple of one-eighth the area of a piece in the first group of puzzle pieces, said second group of puzzle pieces including equilateral triangles, isosceles triangles, and rhomboids.

10. A puzzle as claimed in claim 9 in which each puzzle piece of said second group of puzzle pieces has an area one-half the area of a piece in the first group of puzzle pieces.

11. A puzzle comprising a plurality of puzzle pieces capable when placed in juxtaposition of forming a puzzle shape of a regular geometric pattern, each of a first group of said plurality of puzzle pieces being a rhombus and each of a second group of said puzzle pieces being a regular geometric shape formed by subdividing a rhombus, said second group of puzzle pieces including equilateral triangles, isosceles triangles, and rhomboids with said equilateral triangles being of at least two different sizes.

12. A puzzle set comprising:
a box having a cross section of a regular geometric pattern;
a plurality of puzzles, each puzzle including a plurality of puzzle pieces capable when placed in juxtaposition of forming a puzzle shape of the regular geometric pattern of said box, each of a first group of said plurality of puzzle pieces of at least some of said plurality of puzzles being a rhombus and being of the same area and each of a second group of said plurality of puzzle pieces of at least some of said puzzles having an area equal to an integral multiple of one-eighth the area of a piece in the first group of puzzle pieces, said second group of puzzle pieces including equilateral triangles, isosceles triangles, and rhomboids formed by subdividing a rhombus.

13. A puzzle as claimed in claim 12 in which each puzzle piece of said second group of puzzle pieces has an area one-half the area of a piece in the first group of puzzle pieces.

14. A puzzle set comprising:
a box having a cross section of a regular geometric pattern;
a plurality of puzzles, each puzzle including a plurality of puzzle pieces capable when placed in juxtaposition of forming a puzzle shape of the regular geometric pattern of said box, said plurality of puzzle pieces of at least some of said plurality of puzzles including a first group with the pieces therein being rhombuses, and said plurality of puzzle pieces of at least some of said puzzles including a second group with the pieces therein being equilateral triangles, isosceles triangles, rhomboids, right triangles, regular hexagons and trapezoids formed by subdividing rhombuses.

15. A puzzle comprising a plurality of puzzle piece groups capable when placed in juxtaposition of forming a puzzle shape of a regular geometric pattern, each of said plurality puzzle piece groups having the shape of a rhombus, all of said plurality of puzzle piece groups being of the same area, at least some of said plurality of puzzle piece groups including a plurality of puzzle pieces, each of said plurality of puzzle pieces having an area equal to an integral multiple of one-eighth the area of one of said puzzle piece groups, said plurality of puzzle pieces including geometric shapes formed by subdividing a rhombus of an area equal to the area of one of said plurality of puzzle piece groups.

16. A puzzle as claimed in claim 15 in which the regular geometric pattern is a hexagon.

17. A puzzle as claimed in claim 15 in which said plurality of puzzle pieces includes equilateral triangles, isosceles triangles and rhomboids.

18. A puzzle as claimed in claim 15 in which each of said puzzle pieces has an area one-half the area of one of said puzzle piece groups.

19. A puzzle comprising a plurality of puzzle pieces capable when placed in juxtaposition of forming a puzzle shape of a regular geometric pattern, each of a first group of said plurality of puzzle pieces being a rhombus and each of a second group of said plurality of puzzle pieces being a regular geometric shape formed by subdividing a rhombus, said second group of said plurality of puzzle pieces including equilateral triangles, isosceles triangles, rhomboids, right triangles, regular hexagons, and trapezoids formed by subdividing a rhombus.

20. A puzzle comprising a plurality of puzzle piece groups capable when placed in juxtaposition of forming a puzzle shape of a regular geometric pattern, each of said plurality puzzle piece groups having the shape of a rhombus, all of said plurality of puzzle piece groups being of the same area, at least some of said plurality of puzzle piece groups including a plurality of puzzle pieces, said plurality of puzzle pieces including equilateral triangles, isosceles triangles, rhomboids, right triangles, regular hexagons, and trapezoids formed by subdividing a rhombus of an area equal to the area of one of said plurality of puzzle piece groups.

* * * * *